Figure 1:
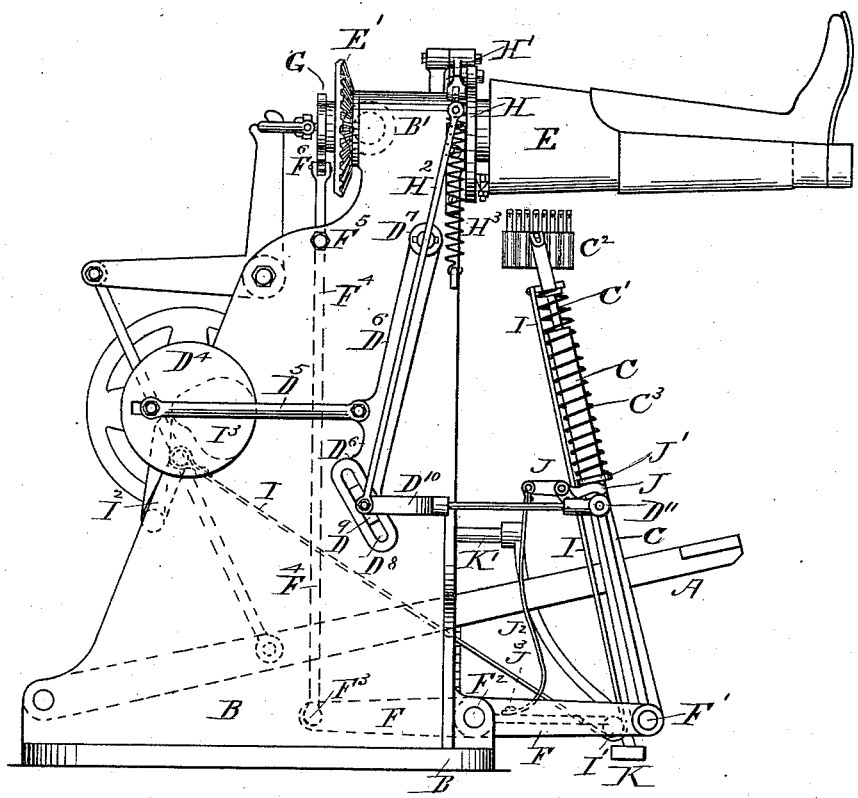

(No Model.)　　　　　　　　　　　　　　　　　　　3 Sheets—Sheet 1.
G. W. COPELAND.
BOOT TREEING MACHINE.

No. 385,298.　　　　　　　　　　Patented June 26, 1888.

WITNESSES.　　　　　　　　　　　　　　　　　INVENTOR.

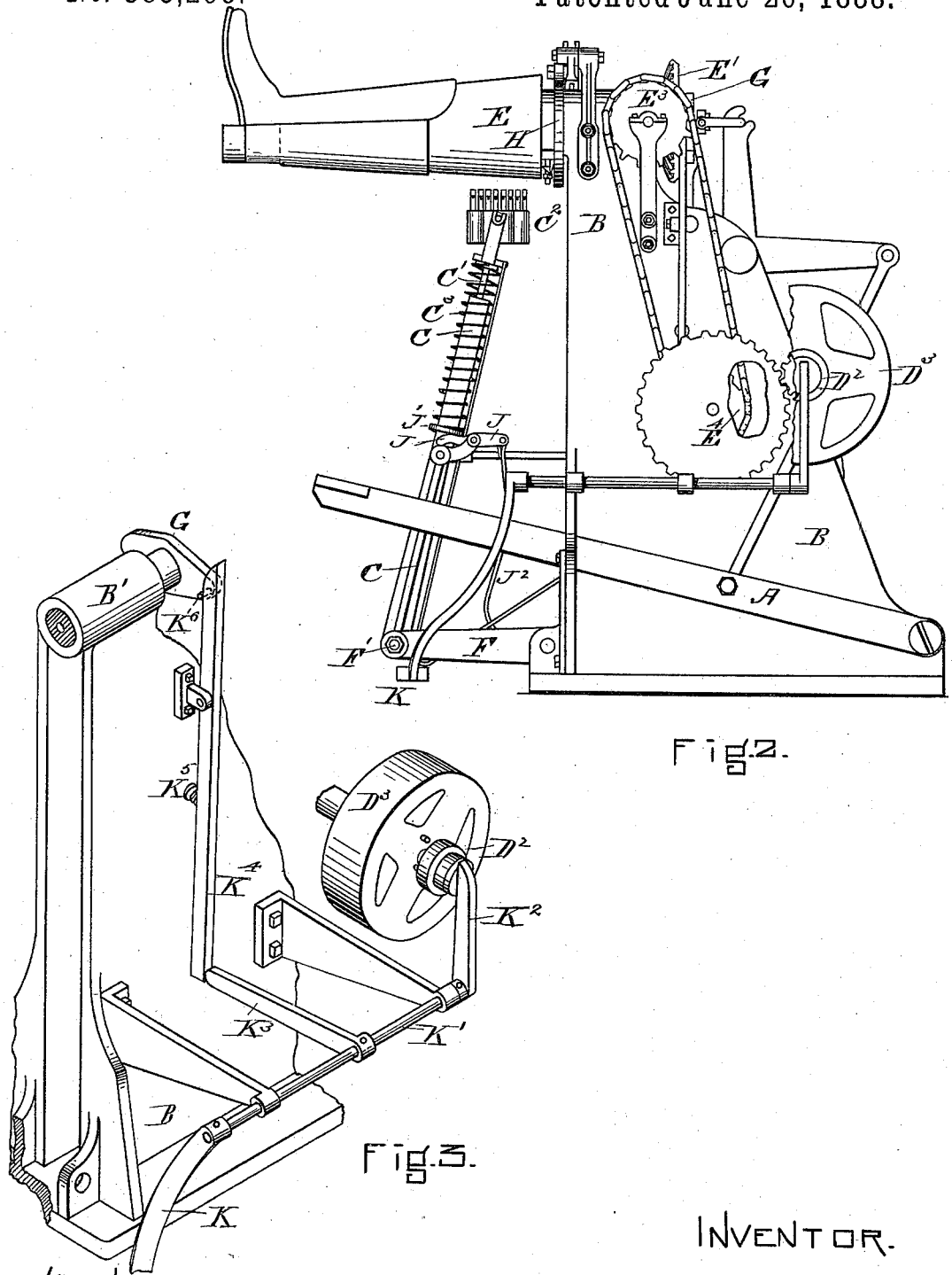

(No Model.) 3 Sheets—Sheet 3.
G. W. COPELAND.
BOOT TREEING MACHINE.
No. 385,298. Patented June 26, 1888.
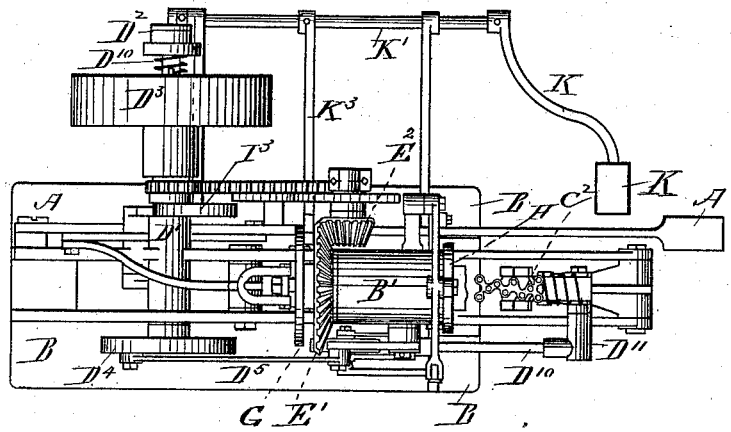
Fig. 5.
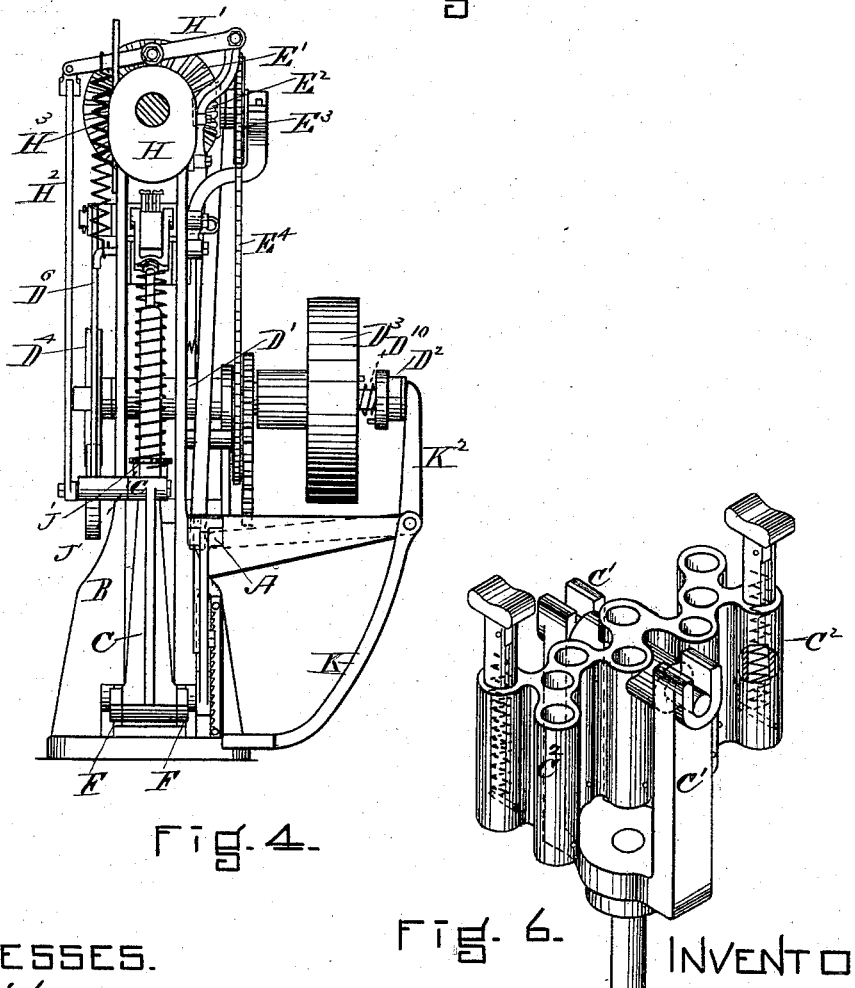
Fig. 4.
Fig. 6.
WITNESSES.
J. E. Crisp.
Frank G. Parker.
INVENTOR.
Geo. W. Copeland.

UNITED STATES PATENT OFFICE.

GEORGE W. COPELAND, OF MALDEN, MASSACHUSETTS.

BOOT-TREEING MACHINE.

SPECIFICATION forming part of Letters Patent No. 385,298, dated June 26, 1888.

Application filed April 23, 1888. Serial No. 271,637. (No model.)

*To all whom it may concern:*

Be it known that I, GEORGE W. COPELAND, of Malden, in the county of Middlesex and Commonwealth of Massachusetts, a citizen of the United States, have invented a new and useful Improvement in Boot-Treeing Machines, of which the following is a full, clear, and exact description, reference being had to the accompanying drawings, forming a part of the specification, in explaining its nature.

This invention is designed to facilitate the operation of treeing boots by rubbing about four-fifths of the entire surface which is to be treed by automatic mechanism so arranged as to leave the part not operated upon by the mechanism in suitable positions to be conveniently operated upon simultaneously by hand.

In the drawings, Figure 1 is a side elevation showing the driving mechanism and method of working the rubbing-tools around the instep while the tree with the boot thereon is revolving; also the mechanism for withdrawing the tools from the boot at the back end of the stroke. Fig. 2 is an elevation of the opposite side, showing mechanism for revolving the tree, mechanism for starting and stopping the machine, and mechanism for jacking the boot. Fig. 3 is a partial elevation, in perspective, of the side shown by Fig. 2, showing fully the details of starting and stopping. Fig. 4 is a front elevation of the machine with the tree removed. Fig. 5 is a plan of the same. Fig. 6 shows the construction of the tool-holder and tools.

In operating the machine the boot, having been prepared in the usual manner, is put upon the tree and stretched or spread thereon by the jacking mechanism connected with the treadle A, A being pivoted to the frame of the machine, B, at A'. The tree E is provided with a bearing at B', and is revolved by the beveled gears E' E², E² being driven by the chain-wheel E³, which is revolved by the chain E⁴, the chain E⁴ being driven by gearing connected to the main shaft of the machine, which gearing is so arranged that the tree is caused to make one revolvtion while the main shaft is making about seventy revolutions. The main shaft D has its bearing in the frame at D'. It is driven by the clutch D², which engages with the constantly-running pulley D³ at the will of the operator by mechanism to be hereinafter described. On the opposite side of the machine (see Figs. 1 and 5) there is attached to this shaft the crank-disk D⁴, which drives the connecting-rod D⁵. This connecting-rod swings the pendulum-lever D⁶, hung upon the frame B at D⁷. The lower end of the lever D⁶ is provided with the slot D⁸, and in this slot is fitted a sliding block, D⁹, to which is connected a supplemental rod, D¹⁰, which is connected at D¹¹ with the oscillating tool-carrying arm C. In the upper end of this arm is fitted the tool-carrying spindle C', with its upper end forked to receive the trunnions of the tool-holder C², Fig. 6, the tools being mounted in the holder with sockets and springs, substantially as shown.

The lower end of the lever C is pivoted at F' to the swinging frame F, (see Fig. 1,) and this swinging frame is pivoted to the frame B at F². To the opposite end of the swinging frame at F³ is connected the rod F⁴, which is provided with a sliding bearing attached to the frame B at F⁵. This rod has at its upper end a cam-roll, F⁶, which is operated by the pattern-cam G to cause the tool carrying frame to follow the contour of the tree during its revolution. When in operation, the spring C³ presses the tool carrier toward the leg of the boot upon the tree, this spring being of sufficient power to press the group of tools in the tool-carrier up to the boot and to hold them in contact therewith while the tools are at work and the tree with the boot thereon is revolving. It will be understood that the cam G and the connections hereinbefore described equalize the tension of the spring C³ in its action upon the tool carrier while it presents the rubbing-tools C² to the surfaces of the boot upon the revolving tree, which surfaces are at different distances from the center of revolution by reason of the peculiar shape of the tree.

Referring to Figs. 1 and 2, it will be seen that the back and sides of a boot-leg require that the stroke of the rubbing-tools should be different in location and length from that required to rub the front of the leg. To secure this result, I employ the cam H, which is fixed to and revolves with the boot-tree. This cam, operating the lever H' and its connecting-rod H², slides up the block D⁹ in the diagonal slot D⁸ of the pendulum-lever D⁶ the distance required to change the location and length of the stroke, as will be clearly understood by reference to Figs. 1 and 4. The spring H³ holds the cam-roll of lever H' to the surface of the cam.

In order to finish the extreme upper end and edge of the boot-leg, it is essential that one or more of the rubbing-tools in the tool-carrier should pass up to and, indeed, beyond that edge. I therefore connect the strap I with the tool-carrying spindle C' near the tool-carrier, and lead it around a roll, I', fixed in the swinging frame F as near as possible to the fulcrum of the oscillating tool-carrying arm C. From that point I connect the strap with the rocker-arm I². This rocker-arm is operated at the proper time to draw the tool-carrier C² and its connections away from the surface of the boot. It does this by means of the cam I³, which compresses the spring C³ at the back end of the stroke of the rubbing-tools. The cam I³ is fixed to the main shaft of the machine. The oscillation of the tool-carrying arm C requires the tools at the heel end of the boot to be farther from the center of oscillation than at the knee end, and the effect is to weaken the spring C³, since the spring is extended farther at that point. To remedy the defect which would thus be caused in the rubbing, I fix the forked lever J, Figs. 1 and 2, to the tool-carrying arm C, so that the forked end of the lever will engage with the washer J' under the spring C³, and to the other end of this lever I connect the strap J², the opposite end of which is fixed at J³ to the swinging frame F, so that when the tools are at the heel end of the boot the strap J², drawing upon its end of the lever J, raises the washer J' and the spring C³ carried upon it sufficiently to equalize the tension of the spring C³.

The operation of the machine is as follows: The boot properly wet and prepared having been jacked upon the tree and a suitable blacking or dressing applied thereto in the usual manner, with the driving-pulley D³ in motion, the operator by pressing upon the foot-piece of the lever K causes the rocker-shaft K' to communicate motion to the lever K² and push the clutch D² against the spring D¹⁰, so that the clutch will engage with the dog on the pulley D³ and cause the main shaft and its connections to revolve. A latch-lever, K³, holds the clutch against the spring D¹⁰ by dropping under the latch K⁴, which is pressed forward by the spring K⁵ when the lever K³ is in proper position to allow such action. When the tree has made a full revolution and the rubbing-tools have passed over their predetermined paths, a pin, K⁶, fixed in the cam G, by pressing against the upper end of the lever K⁴, withdraws the latch end of the lever K⁴ from over K³ and allows the spring D¹⁰ to push the clutch D² away from the pulley D³, and the machine stops, the entire leg having been automatically rubbed. The cam I³ stops in their proper position to hold the tool-carrier C² away from the surface of the boot, so as to enable the operator to turn the boot for strapping, seam-setting, and sizing.

What I claim as my invention, and desire to secure by Letters Patent, is—

1. In a machine for treeing boots, the combination, with a rotary or oscillating boot-tree and a suitable support therefor, of leg-rubbing tools actuated by mechanism, substantially as described, to rub the boot leg automatically, said tools operating on the leg portion only, in the manner as described, so that the foot may at the same time be operated upon by hand, substantially as set forth.

2. In a boot-treeing machine, a rotating or oscillating tree, a pattern-cam mounted on the end thereof, a series of leg-rubbing tools, and intermediate connecting and operating mechanisms, substantially as described.

3. In a boot-treeing machine, the pattern-cam G, operating to cause the swinging frame F to follow the contour of a revolving boot-leg stretched upon a tree, substantially as described.

4. In a boot-treeing machine, the crank-disk D⁴, connecting-rod D⁵, pendulum-lever D⁶, and intermediate rod, D¹⁰, in combination with the tool-carrying arm C, all substantially as shown and described.

5. In a boat-treeing machine, the combination of the cam H, the lever H', and connecting-rod H² with the sliding block D⁹ for the slot D⁸, operating substantially as described and set forth.

6. In a boot-treeing machine, the combination of the strap I, rocker-arm I², and cam I³, operating substantially as described.

7. In a boot-treeing machine, the combination of the strap J² with the lever J and the swinging frame F, substantially as described, and for the purposes set forth.

8. In a boot-treeing machine, the combination of the latch-lever K³, latch K⁴, spring K⁵, and the pin K⁶, operating as described, and for the purposes set forth.

GEORGE W. COPELAND.

Witnesses:
J. E. CRISP,
FRANK G. PARKER.